| United States Patent [19] | [11] Patent Number: 4,919,914 |
|---|---|
| Smith et al. | [45] Date of Patent: Apr. 24, 1990 |

[54] REMOVAL OF HYDROGEN SULPHIDE FROM GASEOUS STREAMS

[75] Inventors: James W. Smith, Toronto; Robert A. Barton, Downsview, both of Canada; Cyril H. Knight, deceased, late of Kleinburg, Canada, by Leslie James

[73] Assignee: 780863 Ontario Limited, Toronto, Canada

[21] Appl. No.: 218,924

[22] Filed: Jul. 14, 1988

Related U.S. Application Data

[63] Continuation-in-part of Ser. No. 11,425, Feb. 3, 1987, abandoned, which is a continuation of Ser. No. 867,631, May 27, 1986, abandoned, which is a continuation of Ser. No. 573,389, Jan. 24, 1984, abandoned.

[30] Foreign Application Priority Data

Jan. 25, 1983 [GB] United Kingdom ................. 8301968

[51] Int. Cl.$^5$ ..................... B01D 53/36; C01B 17/05; C01B 17/10
[52] U.S. Cl. ................................ 423/576.2; 423/224; 423/225; 423/226; 423/228; 423/576.6; 423/576.8
[58] Field of Search ............... 423/224, 225, 226, 228, 423/573.1, 576.2, 576.8, 576.6

[56] References Cited

U.S. PATENT DOCUMENTS

| 3,933,992 | 1/1976 | Andral et al. | 423/573 G |
|---|---|---|---|
| 4,009,251 | 2/1977 | Meulx | 423/226 |
| 4,036,942 | 7/1977 | Sibeud et al. | 423/226 |
| 4,189,462 | 2/1980 | Thompson | 423/224 |
| 4,315,903 | 2/1982 | Fenton et al. | 423/226 |

*Primary Examiner*—Jack Cooper
*Attorney, Agent, or Firm*—Sim & McBurney

[57] ABSTRACT

Hydrogen sulphide is removed from gas streams in rapid and efficient manner by oxidation to sulphur. The process is effected by intimately contacting the hydrogen sulphide in the gas stream with oxygen in an aqueous medium containing a hydrogen sulphide-oxidizing catalyst to effect oxidation of the hydrogen sulphide to sulphur, and transporting the sulphur particles to the surface of the aqueous medium. The sulphur particles collect on the surface of the aqueous medium and may be removed therefrom continuously or intermittently.

10 Claims, No Drawings

4,919,914

REMOVAL OF HYDROGEN SULPHIDE FROM GASEOUS STREAMS

REFERENCE TO RELATED APPLICATIONS

This application is a continuation-in-part of copending U.S. patent application Ser. No. 011,425 filed Feb. 3, 1987 (now abandoned), which is a continuation of application Ser. No. 867,631 filed May 27, 1986 (now abandoned), which itself is a continuation of application Ser. No. 573,389 filed Jan. 24, 1984 (now abandoned).

FIELD OF INVENTION

The present invention relates to the removal of hydrogen sulphide from gas streams.

BACKGROUND TO THE INVENTION

Hydrogen sulphide occurs in various gas streams, for example, in sour natural gas streams and in tail gas streams from various industrial operations in which sulphur containing fuels and combustible materials are burned. Hydrogen sulphide is a highly toxic and odiferous substance, which must be substantially removed from gas streams before their ultimate discharge to atmosphere.

Various processes have been proposed which generally involve the conversion of the hydrogen sulphide to sulphur. One prior art process is that described in U.S. Pat. No. 2,899,267 (Berndt et al), wherein the purification of a hydrogen sulphide-containing air stream is effected by passing the gas stream through an alkaline iron hydroxide suspension. The process is described in this reference as a two-step process, involving an initial formation of ferrous sulfide for the hydrogen sulfide and subsequent oxidation of the ferric sulfide to sulfur.

In another prior art process, described in U.S. Pat. No. 3,068,065, the hydrogen sulphide-containing stream is contacted with a solution of ferric iron complexed with ethylene diamine tetraacetic acid. In this reference, the hydrogen sulphide is similarly removed by reaction to form ferrous sulphide. The solution then is reoxidized in a separate operation to form the ferric ion and sulphur. The sulphur formed in these prior art procedures is separated in an additional processing step.

U.S. Pat. No. 4,099,251 (Meuly) describes a method for removing sulfur dioxide from gaseous streams by oxidation in the presence of a polyvalent chelate solution. Again, a two-step process is described in which ferric iron reacts with the hydrogen sulfide in a first step and the depleted ferric iron is regenerated by oxidation to form sulfur. While this reference describes a variety of specific gas/liquid contacting systems for effecting the reactions, this reference does not describe the specific equipment used in the present invention.

U.S. Pat. No. 4,315,903 (Fenton et al) describes a two-stage operation for contacting a hydrogen sulfide-containing gas stream with an aqueous solution of a specific type of catalyst, namely a water-soluble metal vanadate and water-soluble anthraquinone disulfonate, in a first vessel followed by oxidative regeneration of the spent contact solution with formation of sulfur.

U.S. Pat. No. 4,189,462 (Thompson) is similar to the Fenton patent described above in describing a two-stage sulfur removal by contact of the hydrogen sulfide stream with a reagent and reagent regeneration using oxygen, but differs in that the reactions are carried out in separate zones of a single reaction vessel. The sulfur is removed from the oxidative regeneration zone as a slurry and is removed by filtration.

U.S. Pat. No. 3,933,992 (Andral) describes a procedure for automated regulation of sulfur production units which produce sulfur by the Claus reaction, by regulating the flow of oxygen based on measurement of the concentration of sulfur compounds in a product gas stream.

U.S. Pat. No. 4,036,942 (Sibeud) describes the removal of hydrogen sulfide from gaseous product streams by reaction with oxygen in the presence of a metal amino acid chelate. The processes described require long contact times.

SUMMARY OF INVENTION

It has now been surprisingly found that hydrogen sulphide may be very efficiently and very rapidly removed from gas streams containing the same and the sulphur produced therefrom simultaneously efficiently separated by effecting intimate contact between fine bubbles of hydrogen sulphide and oxygen at a submerged location in an aqueous phase comprising a slurry or solution of hydrogen-sulphide-oxidizing catalyst contained in the agitated flotation cell to effect oxidation of the hydrogen sulphide to sulphur and transporting the sulphur particles so formed to the surface of the slurry.

The present invention is directed to a continuous process for the removal of hydrogen sulphide from hydrogen sulphide-containing gas stream in a truly catalytic operation in which hydrogen sulphide is directly oxidized to sulfur and water with high efficiency, generally greater than 99.99% removal. This result is achieved by the unique combination of steps utilized herein.

The hydrogen sulfide-containing gas stream is continuously fed to a reaction zone in an agitated flotation cell which contains an aqueous medium and a hydrogen sulphide oxidizing catalyst, which is chelated ferric hydroxide dissolved in the aqueous medium. The aqueous medium in the agitated flotation cell has a pH of about 7 to about 11.5 and a temperature of about 10° to about 80° C.

A separate oxygen-containing gas stream also is continuously fed to the reaction medium at a rate at least sufficient to effect complete oxidation of the hydrogen sulphide in the hydrogen sulphide-containing gas stream. The oxygen-containing gas stream, usually air, is introduced to the reaction medium at the same submerged location in the reaction medium as the hydrogen sulphide-containing gas stream and the gas streams are distributed at that location as fine bubbles, which are permitted to rise from the submerged location towards the upper surface of the aqueous medium. Intimate contact between the hydrogen sulphide, catalyst and oxygen occurs, so as to cause rapid catalytic oxidation of hydrogen sulphide during a residence time of less than about 2 seconds in the aqueous medium to form fine sulfur particles and bubbles of hydrogen sulphide-depleted gas stream.

The direct introduction of the oxygen-containing gas stream at the same point of introduction as the hydrogen sulphide-containing gas stream permits the utilization of a quantity of oxygen which does not greatly exceed that for reaction. The possibility of explosion on mixing of the oxygen with combustion gases, such as coke oven gas, at the submerged location is avoided. In addition, by proceeding in this manner, economical use of oxygen is achieved with complete removal of hydrogen sulphide.

The fine sulfur particles which are formed in the oxidation reaction are continuously transported to the upper surface of the aqueous medium by the rising of the bubbles of hydrogen sulphide depleted gas stream so as to collect fine sulphur particles on the surface of the aqueous medium as a removable mass.

In this way, the operations of hydrogen sulphide oxidation to sulphur and recovery of the sulfur so produced for removal from the surface of the aqueous medium are both effected continuously in a single aqueous reaction medium. The use of the agitated flotation cell enables the distribution of fine bubbles of the reactant gas stream to be effected, intimate contact between the reactants and the catalyst to be achieved and the provision of residual fine bubbles of hydrogen sulphide-depleted gas stream to result, to enable there to be achieved transportation of the fine sulphur particles to the surface and collection of such transported particles on the surface.

In contrast to the prior art, the process of the present invention is a truly catalytic one, with oxidation of hydrogen sulphide with oxygen in the presence of ferrous iron occurring without any necessity for regeneration of the catalyst. As already noted in discussion of the prior art above, the prior art has utilized procedures in which the hydrogen sulphide is oxidized by a polyvalent reactant, typically ferric iron, and the reduced form of the reactant is oxidized to its initial valent state for reuse and the sulphur so formed is recovered separately. The substances described in the prior art as "catalysts", therefore, participate as reactants and hence the procedures are not truly catalytic.

The truly catalytic process enables remarkable levels of hydrogen sulphide removal, as high as 99.999%, to be achieved rapidly. The steady state nature of such a process prevents wide swings of concentration and pH such as are encountered in the prior art cyclical oxidation and reduction processes, thereby minimizing by-product formation and permitting the use of lower catalyst concentrations.

The present invention, therefore, not only fully and directly oxidizes the hydrogen sulphide to fine sulphur particles, but the sulfur which is produced is removed from the reaction medium by flotation using the product gas stream. The advantages that accrue from use of the present invention permit a decrease in process equipment capacity by up to two orders of magnitude compared to prior art systems. The applicants are not aware of any prior art which describes or suggests a truly catalytic hydrogen sulphide removal process which also effects sulfur recovery by flotation in the same vessel. In addition, as far as the applicants are aware, there has been no prior suggestion to employ an agitated flotation cell for hydrogen sulphide removal.

DESCRIPTION OF PREFERRED EMBODIMENTS

Oxygen required for the reaction of hydrogen sulphide oxidation is separately introduced, usually in the form of air, into the aqueous phase separate from the hydrogen sulphide-containing stream at the same submerged location in the agitated flotation cell, generally adjacent the impeller. In this way, the quantity of oxygen injected need not greatly exceed that required for reaction, thereby avoiding any possibility of explosion upon mixing of oxygen and combustible gases, such as coke oven gas. The oxygen concentration in the product gas stream exiting the reaction vessel may be monitored and such monitoring used to control the flow of the required amount of oxygen into the aqueous phase.

Fine air bubbles of both the air and the hydrogen sulphide containing gas are formed by the impeller and are intimately mixed in the reaction medium.

In the process of the invention, therefore, the hydrogen sulphide-containing gas stream, along with at least sufficient oxygen to effect oxidation of the hydrogen sulphide, is fed into a vessel housing an aqueous medium, which contains a hydrogen sulphide-oxidizing catalyst, which is a chelated ferric hydroxide. The gas streams distributed in the aqueous medium in the form of bubbles rise towards the surface of the aqueous medium. Intimate contact between the hydrogen sulphide, catalyst and oxygen in the aqueous medium causes the rapid catalytic oxidation of the hydrogen sulphide to fine sulphur particles. The very fine sulphur particles which result are carried by the hydrogen sulphide-depleted gas stream to the surface of the aqueous medium. The sulphur which collects on the surface in this way is skimmed off, typically by allowing it to overflow from the vessel.

Sulphur removal by the flotation operation of the invention in an agitated flotation cell contactor is effective and efficient and avoids sulphur plugging problems encountered when employing the sparged vessels, packed columns, tray columns and spray systems suggested by the prior art.

If the hydrogen sulfide-containing gas stream contains particulate material, such particulate material also is transported to the surface and collected there, so that plugging of the apparatus by accumulated particles is avoided.

The process of the invention, therefore, achieves both hydrogen sulphide oxidation to sulphur and removal of the sulphur so produced by flotation in the same process operation and in the same reaction vessel. This procedure contrasts markedly with the prior art, wherein, irrespective of the process adopted, sulphur separation is effected as a separate operation. The ability to effect hydrogen sulphide conversion and sulphur removal rapidly and efficiently in the same piece of equipment minimizes the capital cost which is required and enables an essentially continuous process to be adopted. The fine bubble formation which results in the present invention and the consequent rapid catalytic reaction enables shallow single-stage vessels to be employed, in contrast to dispersion of liquid in the gas as in the case of the prior art packed towers or spray systems.

The process of the invention is also very efficient and can achieve substantially complete conversion of hydrogen sulphide, generally in excess of 99%, and usually more than 99.99% at stoichiometric excesses of oxygen to hydrogen sulphide of at least 5:1 and even as high as 99.999%, removal, as compared with prior art processes where removal efficiencies are generally about 90 to 95% and residual hydrogen sulphide, therefore, usually results.

The process of the invention is very rapid, so that equipment volume requirements are minimized, even for high concentrations of hydrogen sulphide. The mechanism of the conversion of hydrogen sulphide to sulphur is by way of catalytic oxidation of the hydrogen sulphide to sulphur, there being no evidence from experiments carried out by the inventors of the production of a reduced valent form of the catalyst. Further processing of the catalyst to regenerate the same, such as is effected in the prior art, is not required, so that continuous processing of hydrogen sulphide can be carried out.

The catalyst which is employed in the present invention is a chelated form of ferric hydroxide. The chelating agent may be any convenient chelating agent, typically ethylene diamine tetraacetic acid. Such chelated ferric hydroxide catalysts may be in hydrogen form or salt form, such as, the sodium or ammonium salt form. When this catalyst is used, pH values down to about pH 7 may be used, which is advantageous since acid gases, such as, carbon dioxide and sulphur dioxide, do not become dissolved in the aqueous medium and consume alkali. The operative range is from about pH 7 to about pH 11.5, since above this pH level iron begins to precipitate out of the solution.

Buffering of the catalyst medium to the desired pH value of reaction may be effected with any suitable material. For alkaline pH values, ammonium, alkali or alkaline-earth bicarbonates, carbonates, hydroxides, sulfites, phosphates, borates etc. may be used.

The process of the present invention is able to effectively remove hydrogen sulphide from a variety of different source gas streams containing the same, provided there is at least sufficient oxygen present in the aqueous phase to oxidize the hydrogen sulphide. As noted above, such oxygen may be present in the hydrogen sulphide-containing gas stream to be treated or may be separately added, if insufficient oxygen is present in the hydrogen sulphide-containing gas stream.

Hydrogen sulphide-containing gas streams which may be processed in accordance with the invention include fuel gas and other hydrogen-containing streams, gas streams formed by air stripping hydrogen sulphide from aqueous phases produced in oil refineries, mineral wool plants, kraft pulp mills, rayon manufacturing, and heavy oil and tar sands processings, and a foul gas stream produced in the manufacture of carborundum. The gas stream may be one containing solids particulates or may be one from which such particulates are absent. The ability to handle a particulate-laden gas stream without plugging is beneficial, since the necessity for upstream cleaning of the gas is obviated.

The process of the invention is capable of handling and removing any concentration of hydrogen sulphide in the gas stream. Hydrogen sulphide-fouled gas streams generally contain about 10 ppb to about 10,000 ppm $H_2S$ and the present invention decreases this concentration essentially to zero in a very short retention time in the gas-liquid contactor.

The optimum retention time for the reactants is determined by the required level of $H_2S$ removal and economic factors. As the retention time decreases, the fractional removal of hydrogen sulphide decreases, but at a much slower rate. Generally retention times are from about 0.5 to about 2 seconds, although retention times of 0.1 seconds or less may be used when lower removal efficiencies can be tolerated.

The hydrogen sulphide removal operation may be effected at ambient temperatures of about 20° to 25° C., although higher and lower temperatures may be adopted and still achieve efficient operation, typically about 10° to about 80° C.

The minimum catalyst concentration to hydrogen sulphide concentration ratio for a given gas throughput may be determined from the rates of the various reactions occurring in the process and is influenced by the temperature and the degree of agitation or turbulence in the reaction vessel. This minimum value may be determined for a given set of operating conditions by decreasing the catalyst concentration until the removal efficiency with respect to hydrogen sulphide begins to drop sharply. Any concentration of catalyst above this minimum may be used, up to the catalyst loading limit of the system.

In this invention, therefore, efficient removal of hydrogen sulphide from gas stream is effected while achieving simultaneous recovery of sulphur formed in the removal operation, permitting continuous operation to be carried out.

EXAMPLE 1

A laboratory "GALIGHER AGITAIR" (Trademark) flotation cell was charged with 0.75 litres of ferric ion EDTA sodium salt catalyst at a pH 8.5. The catalyst was prepared by dissolving 7.4 grams of EDTA ferric monosodium salt and 8.4 grams of sodium bicarbonate in 0.750 litres of water.

Air containing 700 ppm by volume of $H_2S$ was passed through the cell via its air injection pipe at a rate of 25 liters per minute at room temperature while the aqueous phase is stirred at a shaft speed of 900 rpm. Over a six hour test period over 99% removal of $H_2S$ from the gas stream occurred. Sulphur was formed by oxidation of the hydrogen sulphide and appeared as a froth which was skimmed from the cell in conventional manner. Simultaneous removal of hydrogen sulphide from the gas stream and recovery of the sulphur produced thereby, therefore, was effected.

During the test, the pH of the aqueous medium dropped to 7.5 but no additional alkali was added for this period. Further, no additional catalyst was used during the period of the test and the catalytic activity was maintained throughout the test, as is evident from the maintenance of the efficiency of removal of hydrogen sulphide.

EXAMPLE 2

The procedure of Example 1 was repeated for varying quantities of catalyst and alkali on a gas stream containing 500 ppm $H_2S$. The results obtained are reproduced in the following Table I:

TABLE I

| Run No. | Amount of Fe (III) NaEDTA | Amount of NaHCO$_3$ | Initial pH | Length of time for removal >99% $H_2S$ (hrs) |
| --- | --- | --- | --- | --- |
| 1 | 4.4 | 4.2 | 9.3 | 10 |
| 2 | 4.4 | 2.5 | 9.2 | 5 |
| 3 | 4.4 | 1.7 | 9.0 | 2 |
| 4 | 4.4 | 0.84 | 8 | 1 |
| 5 | 4.4 | 0 | 5.3 | None |
| 6 | 2.2 | 2.5 | 9.2 | 4 |

In each run and in each of the other Examples, the material skimmed from the surface was analyzed and was found to be elemental sulfur. As may be seen from the results of the above Table, as greater amounts of alkali are present, the period of time for which substantially complete removal can be effected increases.

As the alkali is consumed in the reaction and when the pH drops into the acid range, the efficiency of removal drops significantly, although more than 50% removal of $H_2S$ can be achieved, even down to pH3.

EXAMPLE 3

The procedure of Example 1 was repeated except that EDTA ferric monoammonium salt was used. 10 mls of concentrate containing 95 g/l of ferric ion was diluted in water to 0.6 litres total volume. 2.5 g of sodium bicarbonate were added to provide an initial pH of 8.

Air containing 500 ppm $H_2S$ was passed through the cell at a rate of 25 litres per minute. Over a two hour test period, greater than 99% removal of hydrogen sulphide was achieved.

EXAMPLE 4

The procedure of Example 1 was repeated on the off-gas stream from a mineral wool cupola containing 650 ppm $H_2S$, 500 ppm $SO_2$ and 6% $CO_2$. 500 mls of solution containing 6.6 g of EDTA ferric monosodium salt and 4.2 g of sodium bicarbonate and having an initial pH of 8.8 was used at a shaft speed of 860 rpm. The gas stream was passed through the solution at a flow rate of 35 litres per minute. An initial $H_2S$-removal efficiency of greater than 99% was achieved. After two hours, the pH had dropped to 7 and the removal efficiency was greater than 97%, while after 5 hours, the pH had dropped to 3 and the removal efficiency was about 50%.

EXAMPLE 5

The procedure of Example 4 was repeated at a shaft speed of 900 rpm using 8.8 g of EDTA ferric monosodium salt and 16.8 g of sodium bicarbonate in 550 ml of solution. The initial pH was 8.1 and dropped to about 7.2 after 5 hours. The efficiency of removal of $H_2S$ was greater than 99% during this period.

EXAMPLE 6

A "WEMCO" (Trademark) flotation machine model 28 was charged with 525 litres of solution containing 8 litres of concentrate of EDTA ferric ammonium salt (the concentrate contained 95 g/l of ferric ion) and 8 kg of sodium bicarbonate and having an initial pH of 8.0. A gas stream containing 600 ppm $H_2S$ was passed through the solution at a flow rate of 3 cu.m/min. while agitated by stirring at a rate of 600 rpm.

The hydrogen sulphide was oxidized to sulfur which appeared as a froth which was skimmed from the cell in conventional manner. Over several hours, greater than 99% efficiency of hydrogen sulphide removal was observed.

EXAMPLE 7

A further series of experiments was conducted using the "WEMCO" flotation machine model 28. The results of these experiments are set forth below:

EXPERIMENT #1

A catalyst solution was prepared with 26.3 g NaFeEDTA and 16.8 g $NaHCO_3$ in 4 liters deionized water. A 1000 PPm $H_2S$ stream in nitrogen was drawn through the reactor at a rate of 25 liters per minute with an impeller shaft speed of 1800 RPM. Oxygen was varied in the feed at stoichiometric excesses ranging from 4 to 200. During all experiments the pH of the catalyst solution was maintained between 9 and 9.5.

$H_2S$ removal efficiency always exceeded 99.997% at stoichiometric oxygen excesses of 5:1 or greater.

The results are summarized in table [i].

TABLE [i]

| % Oxygen | Oxygen to $H_2S$ ratio | % $H_2S$ Removal | Maximum Oxygen ppm in outlet |
|---|---|---|---|
| 21 (AIR) | 420:1 | >99.997 | 209,500 |
| 10 | 200:1 | >99.997 | 99,500 |
| 5 | 100:1 | >99.999 | 49,500 |
| 1 | 20:1 | >99.999 | 9,500 |
| 0.5 | 10:1 | >99.999 | 4,500 |
| 0.25 | 5:1 | >99.999 | 2,000 |
| 0.20 | 4:1 | Catalyst sulfided | |

EXPERIMENT #2

A second experiment was conducted under the same chemical conditions as experiment #1 except that the oxygen was introduced through a sparger centered under the impeller. Table [ii] summarizes the results.

TABLE [ii]

| % Oxygen | Oxygen to $H_2S$ ratio | % $H_2S$ Removal | Maximum Oxygen ppm in outlet |
|---|---|---|---|
| 100 | 10:1 | >99.999 | 4,500 |
| 100 | 5:1 | >99.999 | 2,000 |
| 100 | 4:1 | Catalyst sulfided | |

EXPERIMENT #3

The same chemical composition as in experiments 1 and 2 was used to investigate the effect of the sparger location. No effect was noted by moving the sparger against the wall of the vessel and thus out of the forced circulation path. A summary of the results is given in table [iii].

TABLE [iii]

| % Oxygen | Oxygen to $H_2S$ ratio | % $H_2S$ Removal | Maximum Oxygen ppm in outlet |
|---|---|---|---|
| 100 | 10:1 | >99.999 | 4,500 |
| 100 | 5.3:1 | >99.999 | 2,150 |
| 100 | 4.9:1 | Catalyst sulfided | |

EXPERIMENT #4

The effect of a higher hydrogen sulfide inlet concentration was also investigated and no significant effect was noticed. The results are given in table [iv].

TABLE [iv]

| Inlet ppm $H_2S$ | Oxygen to $H_2S$ Ratio | % $H_2S$ Removal | Maximum Oxygen ppm in outlet |
|---|---|---|---|
| 10,000 | 10:1 | >99.999 | 45,000 |
| 10,000 | 6:1 | >99.99 | 25,000 |
| 10,000 | 5.5:1 | Catalyst Sulfided | |

EXPERIMENT #5

A test was performed on a catalyst solution 1/10th as concentrated as that used in experiments 1 though 4. This solution was used to catalyse the oxidation of a 200 ppm inlet gas stream. Table [v] summarizes the results.

TABLE [v]

| Oxygen to $H_2S$ Ratio | % $H_2S$ Removal | Maximum Oxygen ppm in Outlet |
|---|---|---|
| 10:1 | >99.9 | 4,500 |
| 9.5:1 | >99.8 | 4,250 |
| 8.8:1 | >99.7 | 3,900 |
| 8:1 | >99.6 | 3,500 |
| 7:1 | >99.6 | 2,500 |

TABLE [v]-continued

| Oxygen to H₂S Ratio | % H₂S Removal | Maximum Oxygen ppm in Outlet |
|---|---|---|
| 6:1 | Catalyst Sulfided | 5 |

The results of these experiments indicate that the removal can be maintained above 99.999% by the use of a sufficiently concentrated catalyst which does not need to be in excess of 1 g/l for inlet concentrations of approximately 1000 ppm.

The use of a recycle and a separate oxygen injection port enables the production of gas pipeline quality off-gases with less than 400 ppm oxygen. The use of a separate port also reduces the risk of directly contacting a combustible gas with oxygen in one gas stream.

Based on the apparent requirement of 4 times excess oxygen, the reactor can process up to 20,000 ppm H₂S without recycle and still maintain an outlet oxygen concentration equal to or less than 80,000 ppm. If the upper combustible limit for a gas was 8% oxygen then this would be very important. The use of a recycle almost totally eliminates this problem.

SUMMARY OF DISCLOSURE

In summary of this disclosure, the present invention provides an efficient procedure for the removal of hydrogen sulphide from gas streams containing the same which also permits the sulphur to be simultaneously removed. Modifications are possible within the scope of this invention.

What we claim is:

1. A process for the removal of hydrogen sulphide from a hydrogen sulpide-containing gas stream which comprises:

continuously feeding the hydrogen sulphide-containing gas stream to a reaction zone in an agitated flotation cell containing an aqueous medium and a hydrogen sulphide-oxidizing catalyst which is chelated ferric hydroxide dissolved in the aqueous medium, said aqueous medium having a pH of about 7 to about 11.5 and a temperature of about 10° to about 80° C., continuously feeding an oxygen-containing gas stream to said reaction zone in said agitated flotation cell at a rate to provide at least sufficient oxygen to effect complete oxidation of the hydrogen sulphide in said hydrogen sulphide-containing gas stream to sulphur, continuously distributing said gas streams in the aqueous medium at substantially the same submerged location as fine bubbles and permitting the bubbles to rise from said submerged location towards the upper surface of the aqueous medium while intimate contact between the hydrogen sulphide, catalyst and oxygen in the aqueous medium is achieved, so as to cause rapid catalytic oxidation of hydrogen sulphide during a residence time of less than about 2 seconds in the aqueous medium to form fine sulphur particles and formation of bubbles of hydrogen sulphide-depleted gas stream, continuously transporting the fine sulphur particles to the upper surface of the aqueous medium by the rising of said bubbles of hydrogen sulphide-depleted gas stream so as to collect the fine sulphur particles on the surface of the aqueous medium, whereby the operations of hydrogen sulphide oxidation to sulphur and recovery of the sulphur so produced are both effected continuously in a single aqueous reaction medium contained in said agitated flotation cell from the hydrogen sulphide-containing gas stream and the oxygen-containing gas stream fed thereto, and removing sulphur from the upper surface of the aqueous 2. The process of claim wherein said sulphur is removed from the upper surface of said aqueous medium by permitting sulphur to overflow through an outlet from the reaction zone.

3. The process of claim producing a product gas stream and wherein the oxygen concentration in said product gas stream is monitored and the monitored value used to control the flow of said oxygen-containing gas stream to said aqueous medium.

4. The process of claim 1 wherein said hydrogen sulphide-containing gas stream contains from about 10 ppb to about 10,000 ppm H₂S and said process effects greater than 99.99% removal of hydrogen sulphide from said hydrogen sulfide-containing gas stream.

5. The process of claim 1 wherein said contact time is from about 0.5 to about 2 seconds.

6. The process of claim 1 wherein said aqueous medium has a temperature of about 20° to about 25° C.

7. The process of claim 1 wherein said aqueous medium has a temperature of about 20° to about 25° C., said contact time is from about 0.5 to about 2 seconds, said hydrogen sulphide-containing gas stream contains about 10 ppb or about 10,000 ppm H₂S, said oxygen-containing gas stream is air, and said process effects greater than 9.99% removal of hydrogen sulphide from the hydrogen sulphide-containing gas stream.

8. The process of claim 1 wherein the oxygen-containing gas stream is fed at a stoichiometric excess of oxygen to hydrogen sulphide of at least 5:1.

9. The process of claim 1 wherein said sulphur is skimmed off from said upper surface.

10. The process of claim 1 wherein said oxygen-containing gas stream is separately fed to said reaction zone.

* * * * *